July 27, 1937.  A. W. SIMMONS  2,088,177
FLUID PRESSURE BRAKE
Filed Aug. 30, 1935  2 Sheets-Sheet 1
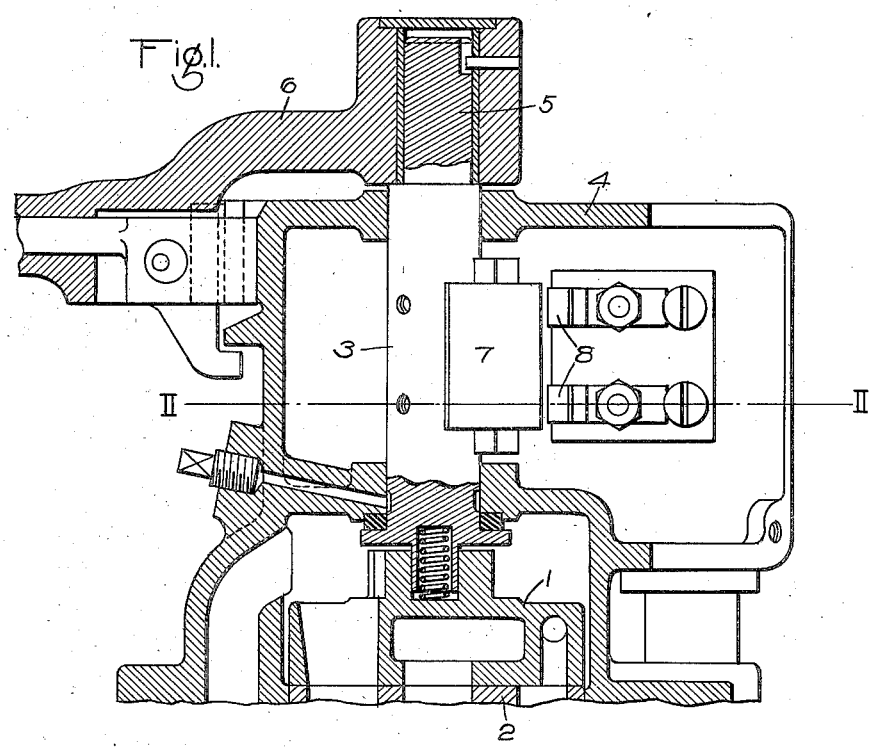
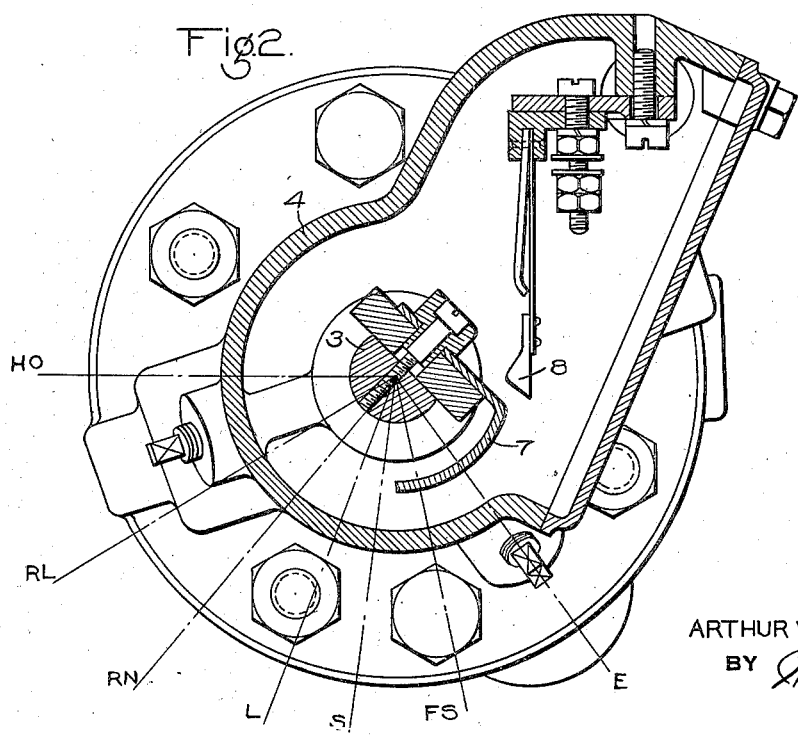
INVENTOR
ARTHUR WILLIAM SIMMONS
BY Wm. M. Cady
ATTORNEY

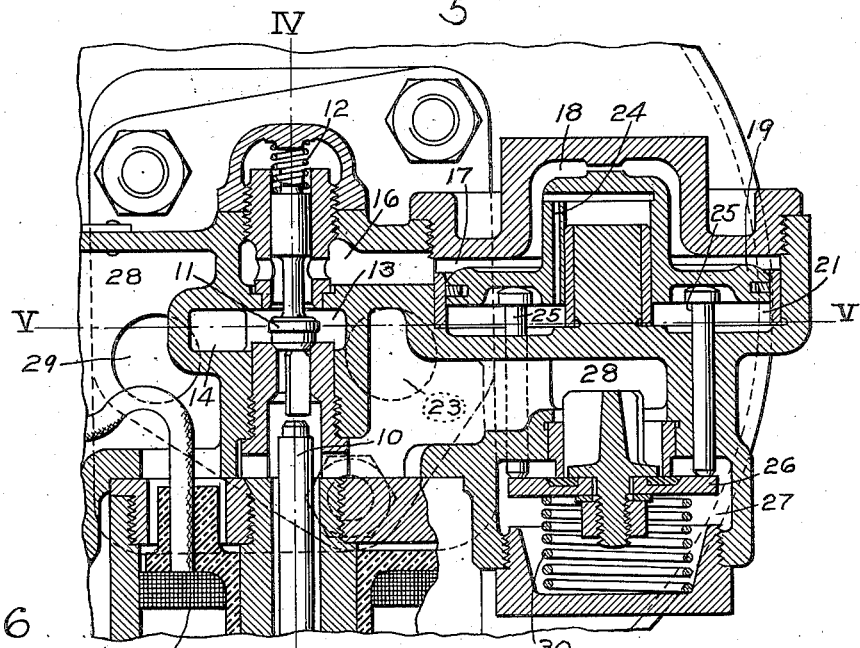
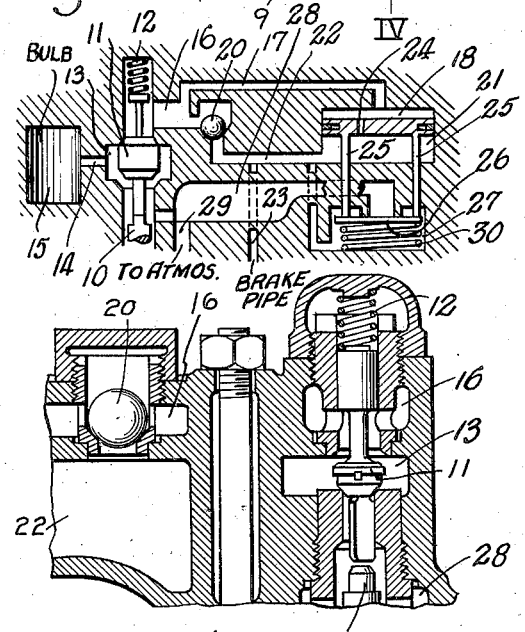
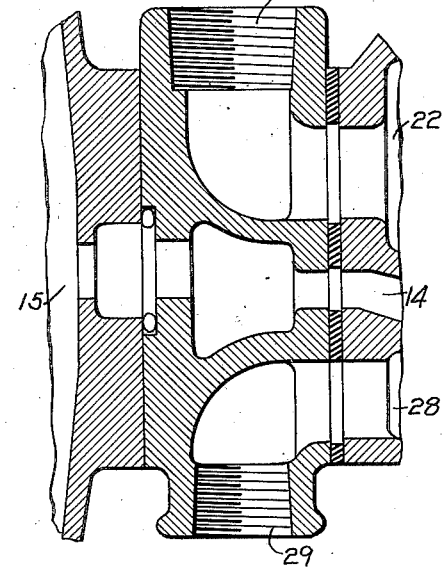

Patented July 27, 1937

2,088,177

UNITED STATES PATENT OFFICE 2,088,177

FLUID PRESSURE BRAKE

Arthur William Simmons, King's Cross, London, England, assignor to The Westinghouse Air Brake Company, Wilmerding, Pa., a corporation of Pennsylvania Application August 30, 1935, Serial No. 38,589
In Great Britain September 4, 1934

9 Claims. (Cl. 303—15)

The invention is illustrated by way of example in the accompanying drawings as applied to braking apparatus of the kind above referred to, Figure 1 being a view in side elevation partly sectional of the driver's brake valve of the apparatus and Figure 2 a sectional plan view on the line II—II of Figure 1. Figure 3 is a view in sectional elevation of the electromagnetically operated valve for controlling the release of fluid from the brake pipe; Figures 4 and 5 are detail sectional views on the lines IV—IV and V—V, respectively, of Figure 3, and Figure 6 is a diagrammatic view of the device shown in Figures 3, 4 and 5, with the parts of the device shown in their normal position.

Referring now first to the driver's brake valve shown in Figures 1 and 2 it will be seen that the brake valve comprises the usual rotary valve element 1 adapted to cooperate with a valve seat 2 and provided with the usual ports and passages for controlling the application and release of the brakes by varying the pressure obtaining in the brake pipe of the apparatus, the brake valve also comprising the usual equalizing discharge valve mechanism (not shown).

The valve element 1 is arranged to be rotated to its various angular positions or settings by means of a rotary spindle 3, the upper end of which projects through the valve casing 4 and terminates in a portion 5 of the square cross-section adapted to receive a removable brake valve handle 6. The latter is arranged in the well known manner to be capable of removal only when the handle is in the "handle off" position indicated by the dotted line HO in Figure 2 and is adapted to be successively rotated to the release, running, lap, service application and emergency application positions indicated by the dotted lines RL, RN, L, S and E respectively, the handle being also adapted to be set to an additional or fast service position intermediate the service and emergency application positions and indicated in Figure 2 by the dotted line FS.

Mounted on and electrically insulated from the spindle 3 is a contact segment 7 adapted in certain angular positions of the spindle 3 and brake valve handle 6 to engage with a pair of spring contacts 8 which are mounted on and electrically insulated from the casing 4 of the brake valve, the contact segment 7 being of such form and so arranged relative to the contacts 8 that when the brake valve handle 6 is in its "handle off" position as shown in Figures 1 and 2 the segment 7 is out of engagement with the contacts 8. When the handle 6 is adjusted to its release position RL, the segment 7 engages with the contacts 8 and remains in engagement therewith as the brake valve handle 6 is successively adjusted to the running position RN, the lap position L and the service application position S. When, however, the brake valve handle 6 is further rotated to the fast service position FS and to the emergency application position E the contact segment 7 is again disengaged from the contacts 8. The latter are included in the energizing circuit of the winding 9 of an electromagnetically operated valve shown in Figure 3 and it will thus be evident that this valve is deenergized in the positions HO, FS and E of the brake valve handle 6 and is energized in the positions RL, RN, L and S of this handle.

Referring now to Figures 3 and 4 it will be seen that the electromagnetically operated valve comprises a valve rod 10 the lower end of which carries an armature (not shown), the rod 10 being adapted to occupy its lower position shown in Figures 3 and 4 when the energizing circuit of the winding 9 of the valve is opened at the contacts 8 as above explained. A double seated valve 11 is under these conditions maintained in its lower seated position as shown by means of a control spring 12. The valve 11 is arranged in a valve chamber 13 which communicates through a passage 14 with a bulb or venting chamber 15, and a chamber 16 above the valve chamber 13 communicates through a passage 17 with a chamber 18 on the upper side of the movable abutment 19 of a relay valve device shown at the right hand side of Figure 3. The chamber 16 also communicates through a non-return ball valve 20 with the chamber 21 on the lower side of the abutment 19, the chamber 21 communicating through a passage 22 with a pipe connection passage 23 leading to the brake pipe.

The abutment 19 is provided with a restricted port 24 establishing communication between the two sides of the abutment and is arranged to operate through thrust rods 25, a vent valve 26 controlling communication between a chamber 27 communicating with the chamber 21 and a chamber 28 communicating with the atmosphere through an outlet passage 29 with the atmosphere. The vent valve 26 is normally held closed by means of a spring 30 and is opened by the downward movement of the abutment 19 as will be hereinafter described.

The operation of the apparatus is as follows:—

With the brake valve handle in its HO position as shown in Figures 1 and 2, the winding 9 of the electromagnetically operated valve shown in Figures 3 and 4 is deenergized and the valve 11 is maintained in its lower seated position by the action of the spring 12. Under these conditions communication is established between the brake pipe and the bulb or venting chamber by way of passages 23 and 22, past the ball valve 20, chamber 16, past the valve 11, chamber 13 and passage 14, communication between the chamber 13 and the chamber 28 leading to the atmosphere being cut off at the valve 11.

When the brake valve handle 6 is adjusted to its RL, RN, L and S positions the brake valve operates in the usual manner to control pneumatically the operation of the braking apparatus and since in these positions the energizing circuit of the winding 9 of the electromagnetically operated valve is completed at the contacts 8, the armature of this valve is attracted and the rod 10 is moved upwards to move the valve 11 from its lower seated position to its upper seated position. In this latter position communication between the chambers 13 and 16 is cut off so that the brake pipe no longer communicates with the bulb 15 while communication is established between the chamber 13 and the chamber 28 leading to the atmosphere. The bulb 15 is thus vented to the atmosphere by way of passage 14, chamber 13, past the lower seat of the valve 11, chamber 28 and passage 29.

When the driver's brake valve handle 6 is adjusted to the fast service position FS, the winding 9 of the electromagnetically operated valve is again deenergized and the valve 11 returns to the position shown in Figures 3 and 4 and under these conditions fluid from the brake pipe is vented to the bulb 15 as above described thereby effecting a predetermined definite reduction in brake pipe pressure in accordance with the capacity of the bulb.

Upon the reenergization of the electromagnetically operated valve by the return of the brake valve handle 6 to a corresponding position, communication between the brake pipe and the bulb 15 is cut off and the bulb is vented to the atmosphere so that the brake pipe can be recharged.

It will be understood that in some cases the bulb 15 may be provided with a permanently open restricted port leading to the atmosphere for effecting the venting of the bulb when the electromagnetically operated valve is energized and in other cases the bulb may be dispensed with entirely, the electromagnetically operated valve when deenergized being arranged to establish communication between the brake pipe and the atmosphere either freely or through a suitably restricted port.

The operation of the relay valve above described is as follows:—

So long as the electromagnetically operated valve is energized, communication between the chamber 16 and the bulb 15 by way of chamber 13 is cut off and the pressures in the chambers 18 and 21 on the two sides of the abutment 19 being equalized through the restricted port 24 in the abutment 19, the vent valve 26 is held closed by the action of its spring 30.

In the event of the electromagnetically operated valve becoming deenergized, this valve will establish communication between the chamber 21 leading to the brake pipe and the bulb 15 so that a reduction in brake pipe pressure will be effected as above described, the vent valve 26 remaining in its closed position as shown in Figure 3. This action will occur when the electromagnetically operated valve is deenergized by the adjustment of the driver's brake valve handle to the fast service position FS, but in the event of the electromagnetically operated valve becoming deenergized for any reason for a position of the driver's brake valve in which the electromagnetically operated valve is normally energized, a reduction in brake pipe pressure, which is effected pneumatically by the brake valve when the handle 6 is placed in fast service position, will evidently cause a corresponding reduction in the pressure acting in the chamber 21 on the lower side of the abutment 19, the pressure in the chamber 18 on the upper side of the abutment 19 being the pressure obtaining in the bulb 15 which remains at its normal value owing to the action of the non-return valve 20. The abutment 19 is consequently moved downwards under the predominating pressure on its upper side and opens the vent valve 26 thereby establishing direct communication between the brake pipe and the atmosphere by way of chambers 27 and 28 and passage 29 and effecting a full application of the brakes. The driver's attention is thus directed to the fact that the electromagnetically actuated valve is improperly deenergized.

The restricted port 24 in the abutment 19 will evidently cause the abutment and the vent valve 26 operated thereby eventually to return to their normal positions after being operated as above described.

The invention is evidently not limited to the particular constructions above described and illustrated by way of example which may be varied in many respects without exceeding the scope of the invention.

Having now described my invention, what I claim as new and desire to secure by Letters Patent, is:

1. In a fluid pressure brake, in combination, a brake pipe, a chamber, electroresponsive means normally establishing a vent communication to said chamber and operative to establish communication from said brake pipe to said chamber through which a local reduction in brake pipe pressure is adapted to be effected, for effecting an application of the brakes, and manually controlled means having one position for effecting the operation of said electroresponsive means to vent said chamber and another position for effecting the operation of said electroresponsive means to establish said communication.

2. In a fluid pressure brake, in combination, a brake pipe, a chamber, electroresponsive means normally establishing a vent communication from said chamber to the atmosphere and operative to close the atmospheric connection to said chamber and establish communication between said chamber and brake pipe through which brake pipe pressure is adapted to equalize into said chamber for effecting a local reduction in brake pipe pressure to effect an application of the brakes, and a manually operated device operable to control the operation of said electroresponsive means.

3. In a fluid pressure brake, in combination, a brake pipe, electroresponsive means operative to effect venting of fluid under pressure from said brake pipe, and valve means conditioned by said operation of said electroresponsive means to operate upon a subsequent reduction in brake pipe pressure to vent fluid under pressure from said brake pipe.

4. In a fluid pressure brake, in combination, a brake pipe, electroresponsive means operative upon deenergization for venting fluid under pressure from said brake pipe, and a valve device conditioned upon deenergization of said means to operate upon a subsequent reduction in brake pipe pressure to vent fluid under pressure from said brake pipe.

5. In a fluid pressure brake, in combination, a brake pipe, a valve device subject to the opposing pressures of the brake pipe and an operating chamber normally charged with fluid under pressure for controlling a communication through which fluid under pressure is adapted to be vented from the brake pipe, and electroresponsive means operative upon deenergization for venting fluid under pressure from said brake pipe to a vent chamber and for connecting said operating chamber to said vent chamber whereby said valve device is conditioned by the equalization of the pressures in the brake pipe, vent chamber and operating chamber to vent fluid under pressure from the brake pipe upon a subsequent reduction in brake pipe pressure.

6. In a fluid pressure brake, in combination, a brake pipe, a valve device subject to the opposing pressures of said brake pipe and an operating chamber communicating with said brake pipe through a passageway, a check valve for preventing flow of fluid under pressure from said chamber through said passageway to said brake pipe, electroresponsive means operative upon deenergization to establish communication between a normally vented vent chamber and said passageway on the operating chamber side of said check valve whereby the pressure of fluid in said brake pipe and operating chamber reduces by equalization into said vent chamber, said valve device being operative upon a reduction in brake pipe pressure to effect a reduction in brake pipe pressure when the pressures in said chambers and brake pipe are equalized.

7. In a fluid pressure brake, in combination, a brake pipe, a valve device subject to the opposing pressures of said brake pipe and an operating chamber communicating with said brake pipe through a passageway, a check valve for preventing flow of fluid under pressure from said chamber through said passageway to said brake pipe, electroresponsive means operative upon deenergization to establish communication between a normally vented vent chamber and said passageway on the operating chamber side of said check valve whereby the pressure of fluid in said brake pipe and operating chamber reduces by equalization into said vent chamber, said valve device being operative upon a reduction in brake pipe pressure to effect a reduction in brake pipe pressure when the pressures in said chambers and brake pipe are equalized, and a brake valve device movable to a position for effecting the deenergization of said electroresponsive means and for at the same time effecting a reduction in brake pipe pressure.

8. In a fluid pressure brake, in combination, a brake pipe, a vent valve operative to vent said brake pipe, a movable abutment for operating said vent valve and subject to the opposing pressures of said brake pipe and an operating chamber normally charged with fluid under pressure from said brake pipe through a passage, a check valve for preventing flow of fluid under pressure through said passage from said operating chamber to said brake pipe, a vent chamber, electroresponsive means normally energized for venting said vent chamber and operative upon deenergization to connect said vent chamber to said brake pipe and to said operating chamber whereby a reduction in brake pipe pressure is effected and a corresponding reduction in pressure in said operating chamber is effected, said abutment being responsive to a reduction in brake pipe pressure for operating said vent valve when the pressures in said chamber and brake pipe are equalized, and a restricted port connecting said operating chamber to said brake pipe for permitting the pressures in said chambers to equalize into said brake pipe when said abutment operates upon a reduction in brake pipe pressure, and means for operating said vent valve to close off venting of said brake pipe upon substantial equalization of the pressures in said brake pipe and operating chamber through said restricted port.

9. In a fluid pressure brake, in combination, a brake pipe, a brake pipe vent valve device comprising a movable abutment subject to the opposing pressures of the brake pipe and an operating chamber and operative by the pressure in said chamber upon a reduction in brake pipe pressure below the pressure in said chamber to vent fluid under pressure from said brake pipe, a reduction chamber, and electroresponsive means normally establishing a vent communication with said reduction chamber and operative to establish communication from said brake pipe to said reduction chamber for permitting equalization of the pressures in said brake pipe and chamber and thereby effecting a local reduction in brake pipe pressure and operative at the same time to reduce the pressure in said operating chamber with and to the same degree as the brake pipe pressure is reduced.

ARTHUR WILLIAM SIMMONS.